United States Patent
Bhattacharya (10) Patent No.: US 9,824,001 B2
(45) Date of Patent: Nov. 21, 2017

(54) SYSTEM AND METHOD FOR STEADY STATE PERFORMANCE TESTING OF A MULTIPLE OUTPUT SOFTWARE SYSTEM

(71) Applicant: Wipro Limited, Bangalore (IN)

(72) Inventor: Sourav Sam Bhattacharya, Fountain Hills, AZ (US)

(73) Assignee: WIPRO LIMITED, Bangalore (IN)

(*) Notice: Subject to any disclaimer, the term of this patent is extended or adjusted under 35 U.S.C. 154(b) by 300 days.

(21) Appl. No.: 14/617,217

(22) Filed: Feb. 9, 2015

(65) Prior Publication Data
US 2016/0232082 A1    Aug. 11, 2016

(51) Int. Cl.
G06F 11/36   (2006.01)
G06F 9/44    (2006.01)
G06F 11/34   (2006.01)

(52) U.S. Cl.
CPC ............ *G06F 11/3688* (2013.01); *G06F 8/70* (2013.01); *G06F 11/3409* (2013.01); *G06F 11/3452* (2013.01)

(58) Field of Classification Search
None
See application file for complete search history.

(56) References Cited

U.S. PATENT DOCUMENTS

| | | | |
|---|---|---|---|
| 6,782,421 B1 * | 8/2004 | Soles | G06F 11/3452 370/252 |
| 7,486,196 B1 * | 2/2009 | Bicheno | G06F 11/324 340/328 |
| 8,024,615 B2 | 9/2011 | Tarta | |
| 8,661,299 B1 * | 2/2014 | Ip | H04L 43/0852 702/185 |
| 2003/0074161 A1 * | 4/2003 | Smocha | G06F 11/3409 702/186 |

(Continued)

OTHER PUBLICATIONS

Avritzer et al., "Software performance testing based on workload characterization," 2002, Proceedings of the 3rd international workshop on Software and performance, pp. 17-24.*

(Continued)

*Primary Examiner* — Thuy Dao
*Assistant Examiner* — Stephen Berman
(74) *Attorney, Agent, or Firm* — Finnegan, Henderson, Farrabow, Garrett & Dunner LLP (57) ABSTRACT

This disclosure relates generally to software performance testing, and more particularly to a system and method for steady state performance testing of a multiple output software system. According to one exemplary embodiment, a processor-implemented performance test for steady-state determination method is described. The method may include executing, via one or more hardware processors, a performance test of a web-based application, calculating, via the one or more hardware processors, a plurality of output metrics based on the performance test, determining, via the one or more hardware processors, whether each of the output metrics has achieved steady state within micro, macro, and global initial time windows, and providing an overall steadiness indication based on the determination of whether each of the output metrics has achieved steady state within the micro, macro, and global time windows.

24 Claims, 5 Drawing Sheets

(56) References Cited

U.S. PATENT DOCUMENTS

| | | | | |
|---|---|---|---|---|
| 2007/0061626 A1* | 3/2007 | Nelson | G06F 11/3688 | |
| | | | 714/38.14 | |
| 2008/0046791 A1* | 2/2008 | Bicheno | G06F 11/3688 | |
| | | | 714/742 | |
| 2008/0208536 A1* | 8/2008 | Bondi | G06F 11/3414 | |
| | | | 702/186 | |
| 2009/0271662 A1* | 10/2009 | Tarta | G06F 11/3672 | |
| | | | 714/37 | |
| 2010/0138813 A1* | 6/2010 | Kim | G06F 11/3688 | |
| | | | 717/131 | |
| 2011/0125466 A1* | 5/2011 | Lada | G06F 17/18 | |
| | | | 703/2 | |
| 2011/0209160 A1* | 8/2011 | Venkatachalam | G06F 9/45504 | |
| | | | 719/317 | |
| 2012/0209571 A1* | 8/2012 | Peterson | G06F 11/3616 | |
| | | | 702/186 | |
| 2012/0253745 A1* | 10/2012 | Dhanapal | G06F 11/3688 | |
| | | | 702/186 | |
| 2013/0006568 A1* | 1/2013 | Baylis | G06F 11/3692 | |
| | | | 702/108 | |
| 2014/0351412 A1* | 11/2014 | Elisha | H04L 41/0806 | |
| | | | 709/224 | |
| 2015/0046757 A1* | 2/2015 | Brew | G06F 11/3452 | |
| | | | 714/47.3 | |
| 2015/0127905 A1* | 5/2015 | Chang | G06F 12/0871 | |
| | | | 711/118 | |
| 2015/0149813 A1* | 5/2015 | Mizuno | G06F 11/1438 | |
| | | | 714/4.11 | |
| 2015/0195157 A1* | 7/2015 | Nayyar | H04L 43/0852 | |
| | | | 709/224 | |
| 2015/0339207 A1* | 11/2015 | Hod | G06F 11/3409 | |
| | | | 717/124 | |
| 2015/0347282 A1* | 12/2015 | Wingfors | G06F 11/3688 | |
| | | | 717/125 | |
| 2016/0098341 A1* | 4/2016 | Pho | G06F 11/3688 | |
| | | | 714/38.1 | |
| 2016/0224898 A1* | 8/2016 | Ryckbosch | G06N 99/005 | |

OTHER PUBLICATIONS

Weyuker et al., "Experience with performance testing of software systems: issues, an approach, and case study," 2000, IEEE Transactions on Software Engineering, vol. 26, Issue 12, pp. 1147-1156.*

Denaro et al., "Early performance testing of distributed software applications," 2004, ACM SIGSOFT Software Engineering Notes Homepage, vol. 29 Issue 1, pp. 94-103.*

* cited by examiner

FIG. 5: Example Computer System

US 9,824,001 B2

SYSTEM AND METHOD FOR STEADY STATE PERFORMANCE TESTING OF A MULTIPLE OUTPUT SOFTWARE SYSTEM

TECHNICAL FIELD

This disclosure relates generally to software performance testing, and more particularly to a system and method for steady state performance testing of a multiple output software system.

BACKGROUND

Problems may arise in the testing of software. Generally, software performance testing can be applied to web based applications and services, encompassing both single server and multi-server (cloud) implementations. Industry standard tools, e.g., HP Performance Center, JMeter, Neoload, LoadRunner, etc., may be used to conduct performance tests. An input traffic profile may be provided by the test domain expert. Conventionally, the domain expert can foretell the number of hits per unit time, at different times of the day and different days of the week, and so on. Capturing these user input data from past data, a performance test engineer may create the input traffic profile.

As the input traffic is injected to the performance test tool, at the output, two or more output metrics may need to be measured simultaneously. Examples of such output metrics include, without limitation: Latency, Throughput, Error Rate, Missed Deadline Percentage, and so on. However, steady state of each one of the outputs may or may not be reached, or the onset of steady state may not be reliably identified. Steady state arrival may be a function of multiple factors, for example, one of which may be the input traffic rate. Complex interdependencies of the system, and interactions with platforms and other external systems (e.g., CPU load, memory availability, network bandwidth, etc) may significantly impact the steady state outcome of the performance test experiment. Thus, currently, performance testers may be unable to reliably determine the overall extent to which a performance test experiment may have reached a steady state, so that the end user may rely on the results of the experiment.

The current industry practice in software tool-based performance testing essentially ignores the notion of steady state arrival—and leaves the steady state determination to the performance test engineer. Existing industrial tools, e.g., HP PC, JMeter, LoadRunner, NeoLoad may not have built-in measurement tools for steady-state determination. Typically, the performance test engineer would determine steady state upon his/her own, manually, by analyzing the output across a time period and making an analytical determination of the steady state.

Currently, performance testing is being carried out by one or more industry standard tools, such as, for example, HP Performance Center™, JMeter™, Neoload™, and LoadRunner™, among others. The performance testing tools are designed to provide an Average value computation of a chosen output metric across a chosen "period of time interval". The selection of the "period of time interval" is up to the discretion of the performance test engineer, who may not have much knowledge or awareness as how to compute a steady state. In the existing experiments, the performance test engineer (A) selects the entire experiment duration as a single time interval and obtains the Average values of the output metrics to report the same to the users, or (B) provides a time varying plot of the output metrics across time to the users to make the best interpretation thereof. Currently, no guidelines are provided to the performance test engineer as to what the optimal time interval should be in order to evaluate the system for steady state, and then report the output metrics.

Consequently, current performance testing may provide inconsistent results because no steady state may be reached prior to generating test result data. If the underlying system did not reach a steady state—the end generated performance data is at best a transient state data, and the user may not rely on any such data for a steady state performance of the software under test. For example, the performance test engineer may reports inconsistent and/or unreliable test results to the business users.

Another disadvantage of current methods of software testing involves software tests yielding two or more output metrics. Most real-world web application software involves multiple (2 or more) output metrics. For example, web application software tests may report on latency and response time. One challenge of testing and reporting on two or more output metrics (for example, M1, M2, etc.) is when M1 may reach steady state, M2 may not (that is, M2 may be transient), and/or vice versa. The underlying software under test may not converge simultaneously to a steady state arrival for M1 and M2. If the software does reach a steady state for all its Output metrics, then it's a highly desired coincidence—but depending upon the physical systems and platforms and the characteristics of the software—such convergence may never occur.

In such cases, even if the performance test engineer possesses sufficient time and training to measure steady state, the test engineer may be constrained to determine steady of one metric (M1) and not the other metric (M2). The subjectivity involved, if the software under test should be measured and reported when M1 is steady or when M2 is steady, may lead to incorrect and unreliable reporting. The problem may be amplified if there are three or more metrics. Under current methods of measurement, the test engineer would be required to consider all possible combinations of output metrics to determine which one must reach steady state while the rest may not reach steady state at all.

SUMMARY

In one embodiment, a processor-implemented performance test steady-state determination method is described. The method may include executing, via one or more hardware processors, a performance test of a web-based application, calculating, via the one or more hardware processors, a plurality of output metrics based on the performance test, determining, via the one or more hardware processors, whether each of the output metrics has achieved steady state within micro, macro, and global initial time windows, and providing an overall steadiness indication based on the determination of whether each of the output metrics has achieved steady state within the micro, macro, and global time windows.

According to another embodiment, a performance test steady-state determination system is described. The determination system may include a hardware processor, and a memory storing instructions executable by the hardware processor. The instructions may be configured for executing, via one or more hardware processors, a performance test of a web-based application, calculating, via the one or more hardware processors, a plurality of output metrics based on the performance test, determining, via the one or more hardware processors, whether each of the output metrics has achieved steady state within micro, macro, and global initial time windows, and providing an overall steadiness indication based on the determination of whether each of the output metrics has achieved steady state within the micro, macro, and global time windows.

According to yet another embodiment, a non-transitory computer-readable medium storing performance test steady-state determination instructions is described. The instructions may be configured for executing, via one or more hardware processors, a performance test of a web-based application, calculating, via the one or more hardware processors, a plurality of output metrics based on the performance test, determining, via the one or more hardware processors, whether each of the output metrics has achieved steady state within micro, macro, and global initial time windows, and providing an overall steadiness indication based on the determination of whether each of the output metrics has achieved steady state within the micro, macro, and global time windows.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Purely illustrative embodiments of the present disclosure are listed below.

Embodiments of the present disclosure measure/determine the steady state of a performance testing of a web based software, with two or more output metrics, e.g., latency and response time. When simulating software performance, the performance of the software may be characterized using two distinct concepts: the steady state of the software and the transient state of the software. In some embodiments, the steady state describes when a system which has reached a form of equilibrium. For example, when the external conditions and software input are maintained for a period of time at the same level, the system will continue to perform identically for an unbounded period of time when the steady state has been achieved. In some embodiments, the transient state of software describes a system that is in flux and undergoing changes with respect to time.

Determination of the steady state may be an important step before reporting any performance test data to the end customer or user. Unless the end user is explicitly aware and expecting performance results that reflect non-equilibrium, the most common and expected interpretation of performance test results is that the system has reached equilibrium and will continue to function as-it-is-now, for future time periods if the same input and environmental conditions are upheld. Users expect software to perform reliably in a variety of conditions. This expectation may not be satisfied unless a steady state is reached. If steady state is not reached, the same test, if continued for another duration of time or under different circumstances may produce different and/or unpredicted results. The system may saturate, may trigger failures and/or lead to unexpected software configurations. Therefore, determining a steady state condition has been achieved may be an important step prior to collecting performance test data is gathered and reported.

Figure 1:
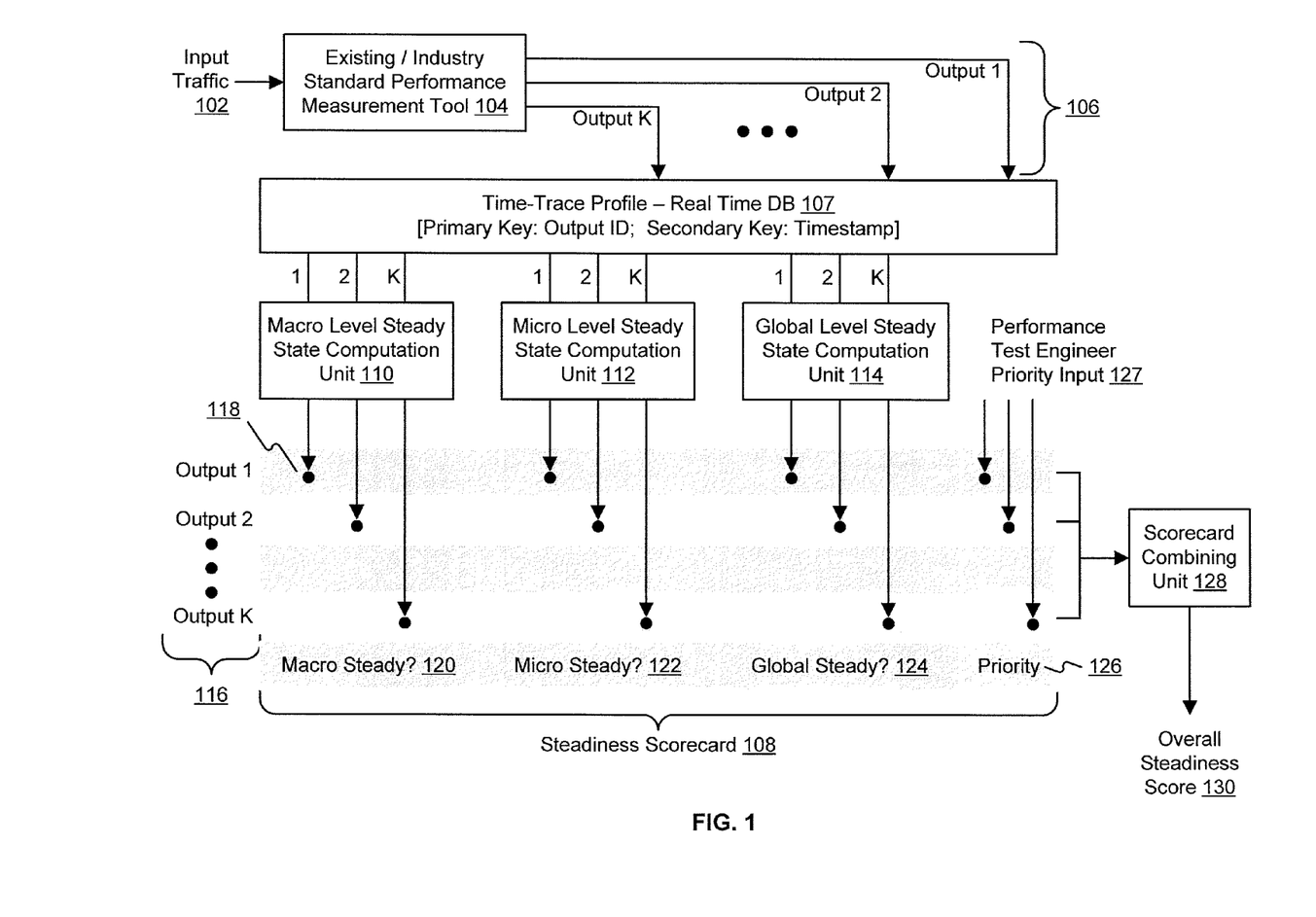
FIG. 1 illustrates an exemplary steady state performance testing system according to some embodiments of the present disclosure.

According to exemplary embodiment depicted in FIG. 1, a steady state performance testing system 100 is depicted, according to embodiments of the present disclosure. The steady state performance testing system 100 (hereafter "system 100") may be configured to measure and determine the steady state of software output metrics 106. According to some embodiments, system 100 may provide automated tools for steady state determination across three levels of temporal granularity: 1) macro level steady state, 2) micro level steady state, and 3) global level steady state. System 100 may include a scorecard matrix tool which may be configured to indicate a particular status of steady state for each one of output metrics 106.

An input traffic profile may be provided by the test domain expert, which may give technical details in connection with the input traffic 102 being tested. According to some embodiments, the traffic profile may include traffic characterizations, such as, for example, a ramp up period, a flat and steady traffic rate, and either a ramp down period or an abrupt end. The slope of the ramp up phase, the duration of the flat rate as well as the slope of the ramp down phases are all traffic profile characteristics that may be changeable by the performance test engineer.

Input traffic 102 may include traffic density information. For example, the domain expert may specify in the traffic profile the number of hits per unit time at different times of the day and different days of the week and so on. Capturing these user input data from past data, the performance test engineer may gather and create a traffic profile. System 100 may include a performance measurement tool 104. As input traffic 102 is provided to performance measurement tool 104, two or more metrics may be utilized to measure output metrics 106. Examples of two or more output metrics 106 may include, for example, latency, throughput, error rate, and missed deadline percentage, among others.

Performance measurement tool 104 may be one or more industry standard testing tools, such as, for example, HP Performance Center™, JMeter™, Neoload™, and/or Load-Runner™, among others. System 100 may receive input traffic 102 and process input traffic 102 through performance measurement tool 104. Performance measurement tool 104 may output metrics 106 and record values for the output metrics in trace profile database 107.

Trace profile database 107 may be a real-time database. System 100 may populate values of trace profile database 107 by writing output metrics 106 from performance measurement tool 104. Trace profile database 107 may be a spreadsheet, and/or other database known in the art.

System 100 may include a macro level steady state computation unit 110, a micro level steady state computation unit 112, and a global level steady state computation unit 114. Macro level steady state computation unit 110 may receive outputs from trace profile database 107 for each one of the output metrics 106 and produce K Boolean values equal to either 1 or 0 for outputs 1 to "K" (collectively, output metrics 106). A value is equal to 1 for every 1% time window (i.e., for each one of the 100 such windows) the maximum value of the output metric and the minimum value of the output metric is within a +/− delta threshold of the average computed across the said window.

Micro level steady state computation unit 112 may also receive outputs from trace profile database 107 for each one of output metrics 106, and produce K Boolean values equal to either 1 or 0 for outputs 1 to "K" (collectively, outputs metrics 106). Micro level steady state computation unit 112 may compute a value is equal to 1 for every 10% time window. For example, there may be 10 such windows for a micro level steady state analysis as opposed to 100 such windows for the macro level analysis.

Global level steady state computation unit 114 may also receive outputs from trace profile database 107 for each one of output metrics 106, and produce K Boolean values equal to either 1 or 0 for outputs 1 to "K" (collectively, output metrics 106). Micro level steady state computation unit 112 may compute a value is equal to 1 for every 100% time window. For example, there may be 1 such windows for a global level steady state analysis as opposed to 10 such windows for the micro level analysis. The global level analysis may encompass the entire span of the input traffic profile.

System 100 may further include a steadiness scorecard 108. According to some exemplary embodiments, system 100 may measure steady state in multiple time-range tiers. System 100 may include a macro level steady state computation unit 110, a micro level steady state computation unit 112, and a global level steady state computation unit 114 to measure a corresponding one of macro, micro, and global time tiers. For example, system 100 may measure medium durations of time using macro level steady state computation unit 110. System 100 may measure the shortest durations using a micro level steady state computation unit 112. System 100 may measure the overall time span of the experiment using global level steady state computation unit 114. The proposed three time scales are—for Micro, 1% of the overall time of the test window; for Macro, up to 10% of the overall time of the test window, and for Global the entire 100% of the test window.

Practical observations of real-world data often indicate that some outputs may reach a steady-state when observed across longer time duration, but there may be wide variations macroscopically. The converse may also be true, where there may not be much variation of the output metric value macroscopically but across a broad passage of time the output metric fundamentally may shift in its value range.

System 10 may also include a steadiness scorecard 108. Steadiness scorecard 108 may depict an overall snapshot of all output metrics, and include an indication of whether steady state has been accomplished. Steadiness scorecard 108 may include a matrix of K rows and four columns, where each of the K rows correspond to the Kth output metric of output metrics 106. The first three columns represent the steadiness computation values of either 1 or 0 from the micro, macro and global steadiness computation units (110, 112, and 114, respectively). The fourth column is filled with priority values for each one of output metrics 106. Steadiness scorecard 108 may include a plurality of rows 116, which may include one row for each of the plurality of output metrics 106. Column values in the rows 116 may indicate whether or not any type of steady state was reached as well as the priority of this output metric with respect to other output metrics.

Steadiness scorecard 108 may include four columns indicating whether steady state has been reached with respect to output metrics 106 with respect to a particular time window. For example, each one of the first three columns (column 120 for micro, column 122 for macro and column 124 for global, respectively) may indicate whether steady state is reached for the each of the plurality of output metrics 106 (as depicted in a corresponding one of rows 116). Each of the plurality of output metrics 106 may receive a steady state mark 118, which may have a value of "1", indicative that steady state was reached for that respective time window, or a value "0" indicative that steady state was not reached. For example, if a particular output metric reached micro and global steady state, but not macro steady state, then the first three columns for its row shall have a value=(1, 0, 1).

Steadiness scorecard 108 may also include a priority column 126 to indicate a relative input priority. Priority input 127 may originate as input from a user, such as, for example, a performance test engineer. Priority column 126 may indicate the priority of the output metric in regarding its relative importance for reaching steady state. Some output metrics are fundamentally more important to reach steady state, such as, for example, latency. Other output metrics may be less critical to reach steady state, such as, for example, memory utilization, as long the utilization stays below a certain threshold. Priority column 126 may include one or more of three-level priority values: "high," "medium," and "low", or H/M/L, for each one of output metrics 106. H, M, and L may correspond to a relative weight (such as, for example, a multiplying factor) input into scorecard combining unit 128.

Scorecard combining unit 128 may receive matrix values from macro level steady state computation unit 110, micro level steady state computation unit 112, a global level steady state computation unit 114. Accordingly, scorecard combining unit 128 may receive [K, 4] matrix values, and compute a single overall steadiness score 130. The equation for computing the overall steadiness score is the overall steadiness score may be generated as: $S=\Sigma_{j=1}^{K}P_j\times(B_j^{Micro}+B_j^{Macro}+B_j^{Global})$, where S is the overall steadiness score, K is a number of output metrics 106, $P_j$ is a priority weight corresponding to a $j^{th}$ metric, and $B_j^{Micro}$, $B_j^{Macro}$, and $B_j^{Global}$ are values indicating steadiness of the $j^{th}$ metric within the micro, macro, and global time windows respectively. Priority values may be normalized, such that the total of all priorities for the K output sums to 1. Because each one of the macro, micro, and global steadiness values can either be 1 or 0, the maximum the above equation can add to 3, and the minimum sum is 0. The overall steadiness score may be a computed value between 0 and 3, with a mid-point threshold being the separator between steady versus transient. The mid-point parameter may be equal to 1.5.

The first three columns values are used as input to the linear equation that computes the end steady state value. Scorecard combining unit 120 may indicate an overall steadiness score 122, which may be indicative of the overall steadiness of the software being tested by system 100. "J" represents the J-th output from the performance test tool. According to some exemplary embodiments, there may be a total of K outputs, where K>1.

Figure 2:
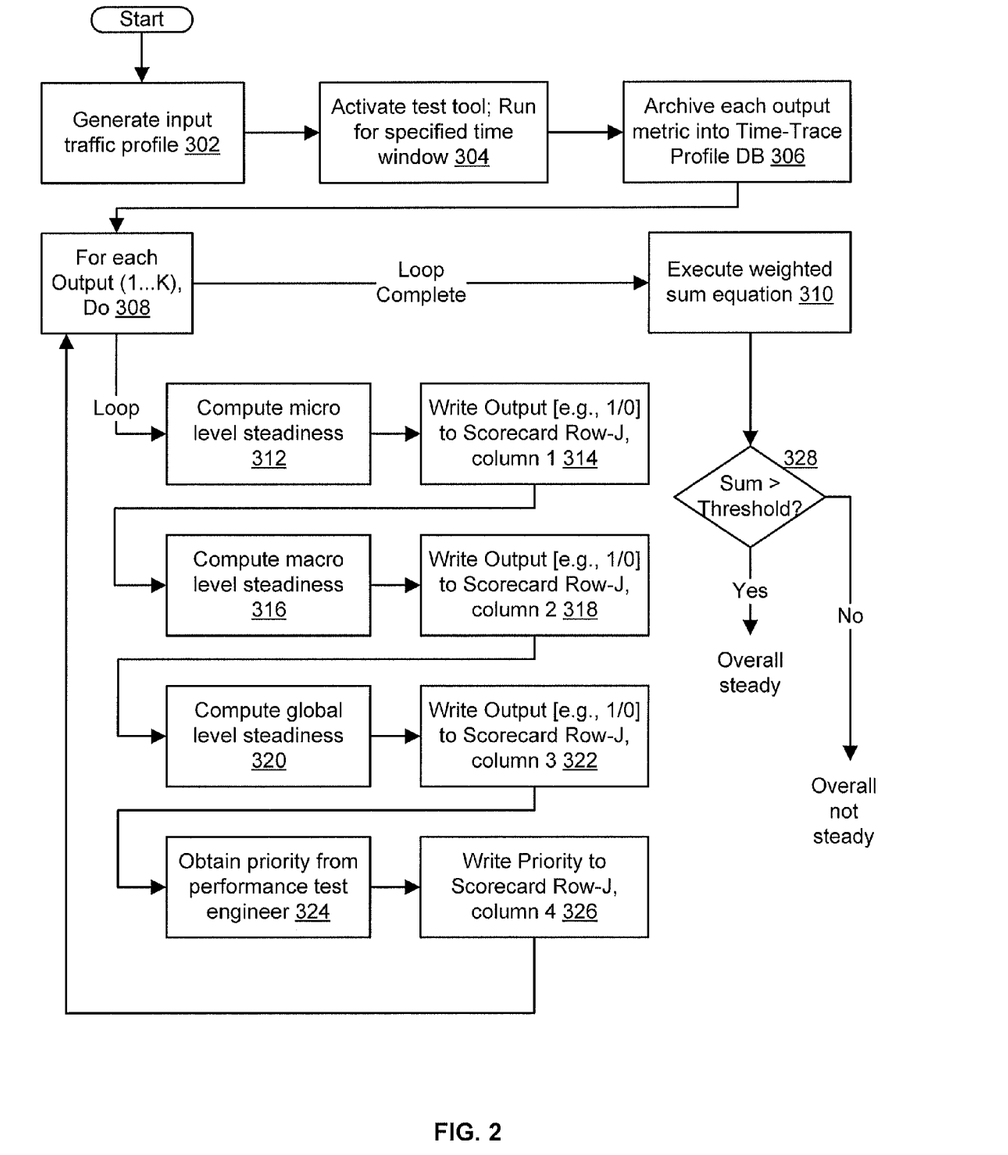
FIG. 2 is a functional block diagram of computing an overall steadiness score using the system of FIG. 1, according to some embodiments of the present disclosure.

FIG. 2 illustrates a method for steady state performance testing 300 in accordance with some embodiments of the present disclosure. According to some embodiments of the present disclosure, a traffic profile is generated (step 302). System 100 may receive the traffic profile. The traffic profile may be generated by a performance test engineer, and/or be generated automatically by system 100. Upon receiving the input traffic profile, system 100 may align with the goals of the performance test experiment according to the traffic profile, and execute the performance measurement tool 104 (step 304). System 100 may operate performance measurement tool 104 for a time window equal to the execution window for the input traffic profile.

Figure 3:
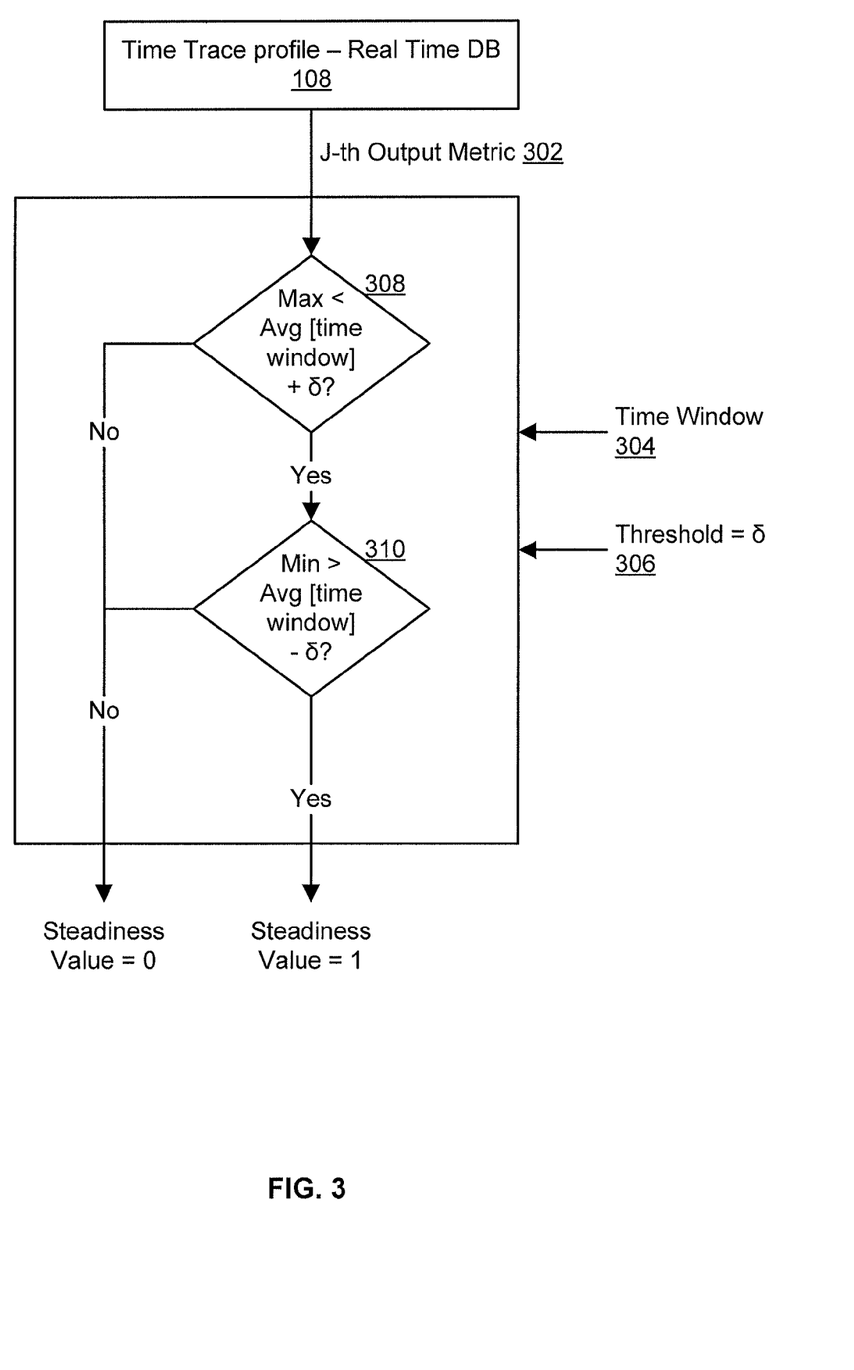
FIG. 3 is a flow diagram illustrating a method for steady state performance testing in accordance with some embodiments of the present disclosure.

At step 306, system 100 may output each output metric into trace profile database 107. System 100 may write each one of output metrics 106 to the trace profile database 107. (step 308). FIG. 3 depicts a method for determining an overall steadiness score computation for system 100 for each J-th output metric (from the plurality of output metrics 106), according to some embodiments of the present disclosure.

Referring now to FIG. 3, at block 308, system 100 may generate the J-th number 202 of the K number of output metrics 106. By querying the respective output metrics for the respective time windows, system 100 may compute a steadiness value equal to 1 or 0. For each step, the result value (1 or 0) may be written onto the steadiness scorecard 108. System 100 may also retrieve, from the input traffic profile, information indicative of the time window 204 that represents a percentage of the input traffic timespan. As previously discussed, time window 204 may be 1% (of the total input traffic profile timespan) for micro, 10% for macro and 100% for global. Scorecard combining unit 128 may input a threshold parameter that may be used to determine how much variance threshold value 206 is permitted to determine whether a steady state has been reached.

At step 308, system 100 may determine whether a maximum value for the J-th output metric 302 deviates by less than predetermined threshold value 306 from the average value. If so, then system 100 may determine whether a minimum value for J-th output metric 302 deviates by less than predetermined threshold value 304 from the average value 306. If both of steps 308 and 310 are true, the output steadiness indicator may be equal to 1. If either of steps 208 and 210 are false, then the output steadiness indicator may be set equal to 0.

Referring again to FIG. 2, system 100 may compute the micro steadiness level (step 312) according to the method described with respect to FIG. 2. System 100 may then write a steadiness value to steadiness scorecard 108 for micro level steadiness. Similarly, system 100 may compute the steadiness levels for macro and global time windows, and write outputs corresponding to steadiness values (steps 316-322, respectively).

At step 324, system 100 may obtain input from the performance test engineer indicative of one or more priority inputs, and write the input to trace profile database 107 (step 326). System 100 may execute a weighted sum equation (step 310). Accordingly, the priority values may be normalized according to the input such that the summation of all priority values adds to 1.

At step 328, the result may be compared against threshold value 206. If the executed weighted sum equation totals greater than the threshold value, then the steadiness scorecard 108 may be marked steady. If not, steadiness scorecard 108 is marked not steady.

According to some embodiments, the concept of a 3-tier performance steadiness measurement system, at macro, micro, and global levels can be extended to several directions, as explained below. For denotational simplicity, let us assume that a 3-tuple, such as (101) indicates that steadiness for (macro, micro and global) levels have been (achieved, not achieved and achieved) respectively, where a "1" indicates achieved and a "0" indicates not achieved.

In some embodiments, alarms may be triggered by the 3-tuple. For example, if a pattern (011) is reached, it may mean that the data is globally steady while macro level unsteadiness inherent in the nature of the underlying system is perfectly acceptable. A software alarm system can be connected to the scorecard computation box, which may detect this pattern (011) and trigger an end action—such as an email or a pager alert or a more sophisticated downstream device may be activated.

In some embodiments, downstream systems such as servers or storage units may be are allocated (e.g., brought on-line, started up, on have process execution initiated) based upon the 3-tuple performance data recorded. For example, if the 3-tuple performance data is (000), it may indicate an overall unsteady system, and more server or storage resources may be commissioned at run-time to stabilize the system performance.

In some embodiments, the underlying measured system may not be restricted to a software performance measurement unit, but may be a different real-time system with time-varying stats, e.g., financial data, trading data, currency data, and so on. Alarms can be created based upon the 3-tier stability of the said transactions. As an example, a particular stock symbol may be steady (or, unsteady) at seconds, minutes and hourly level, reflecting the 3-tiers of macro, micro and global steadiness. These alarms may be applicable to the respective domains, e.g., stock picker alerts, or currency exchange alerts and so on.

Alternate embodiments can provide additional features out of the 3-tuples, by monitoring trend data. For example, the score card can be linked to a rule database, to gather trend rate across time profile. A trend such as [(000)→(001)→(011)] indicates one type of convergence of the system, as opposed to a divergence in a trend such as [(110)→(100)→(000)]. One can predict convergence time based upon the trend rate, and computing based upon the inter-arrival time between the 3-tuples. Analysis such as the system is converging at the rate of 10% per 8 minutes, or the system is not converging at all over the last 90 minutes are possible using rules that track the trend between the 3-tuples and the inter-arrival time between the 3-tuples.

Figure 4:
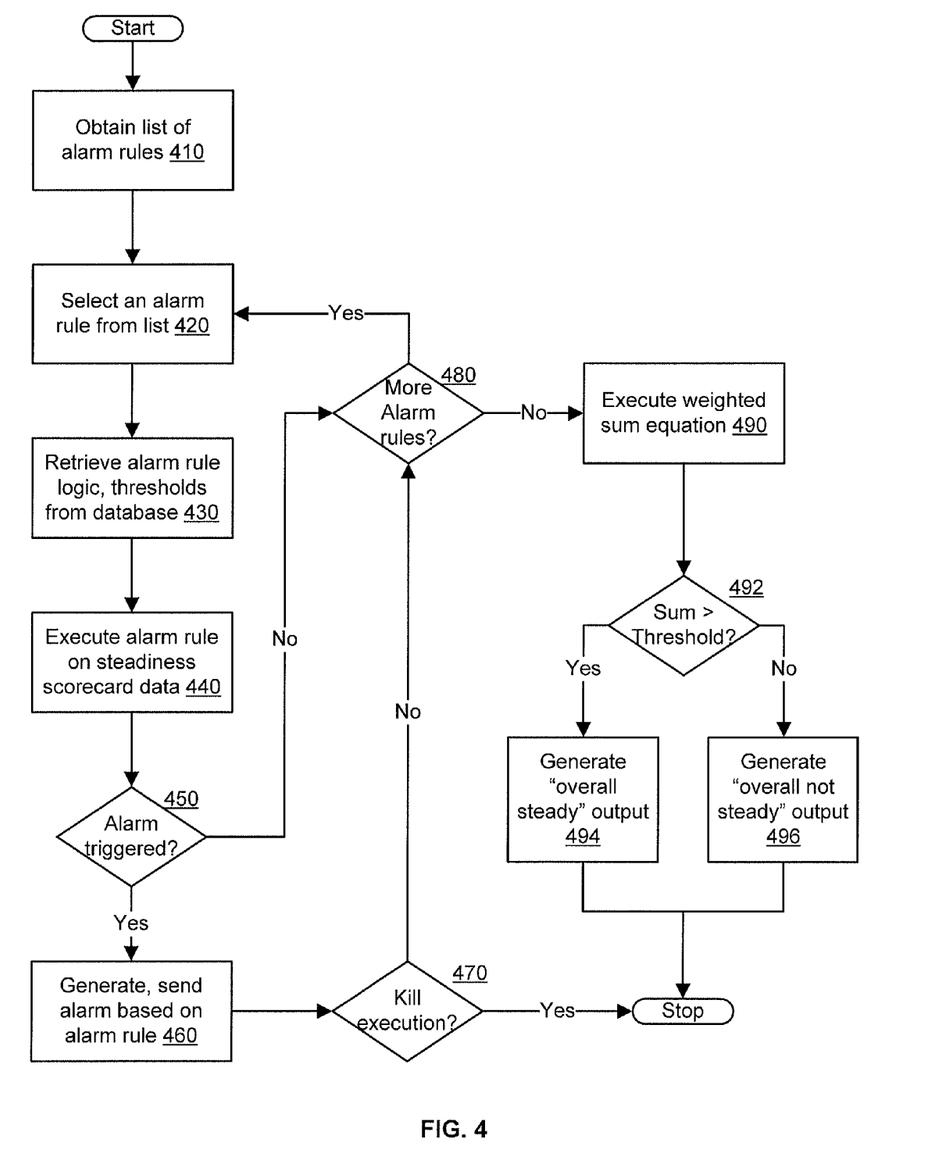
FIG. 4 is a flow diagram illustrating a method of operation for a scorecard combining unit.

FIG. 4 is a flow diagram illustrating a method of operation for a scorecard combining unit. In some embodiments, a step 410, a scorecard combining unit 128, or other part of the test system 100, may obtain a list of alarm rules to execute to generate required alarms. At step 420, an alarm rule may be selected from the list for processing, and at step 430, an alarm rule logic and/or alarm rule threshold(s) may be retrieved from an alarm rules database. At step 440, the alarm rule may be executed by an alarm rules engine, using the alarm rule logic and/or alarm rule threshold(s) upon the steadiness scorecard 108 data (e.g., current and/or historical steadiness scorecard data). If an alarm is triggered by the execution (see step 450, "yes"), at step 460, an alarm may be generated based on the alarm rule logic and/or threshold(s), and may be sent to the appropriate system or user. Further, at step 470, test system 100 may perform a check to determine whether the generate alarm requires killing execution of the scorecard combining unit 128. If so, the scorecard combining unit 128 processing may be terminated. Otherwise, at step 480, the test system 100 may determine whether additional alarm rules remain to be processed, and may process them serially or in parallel with each other, similar to the procedure described above. In some embodiments, if all needed alarm rules have been processed and no alarm has killed execution (see step 480, "no"), at step 490, scorecard combining unit 128 may continue with regular processing, as described above, including executing a weighted sum calculation using the steadiness scorecard 108 data. At step 492, the weighted sum may be compared against a threshold. If the weighted sum exceeds the threshold (step 492, "yes"), at step 494, an "overall steady" output may be generated. If the weighted sum does not exceed the threshold (step 492, "no"), at step 496, an "overall not steady" output may be generated.

Computer System

Figure 5:
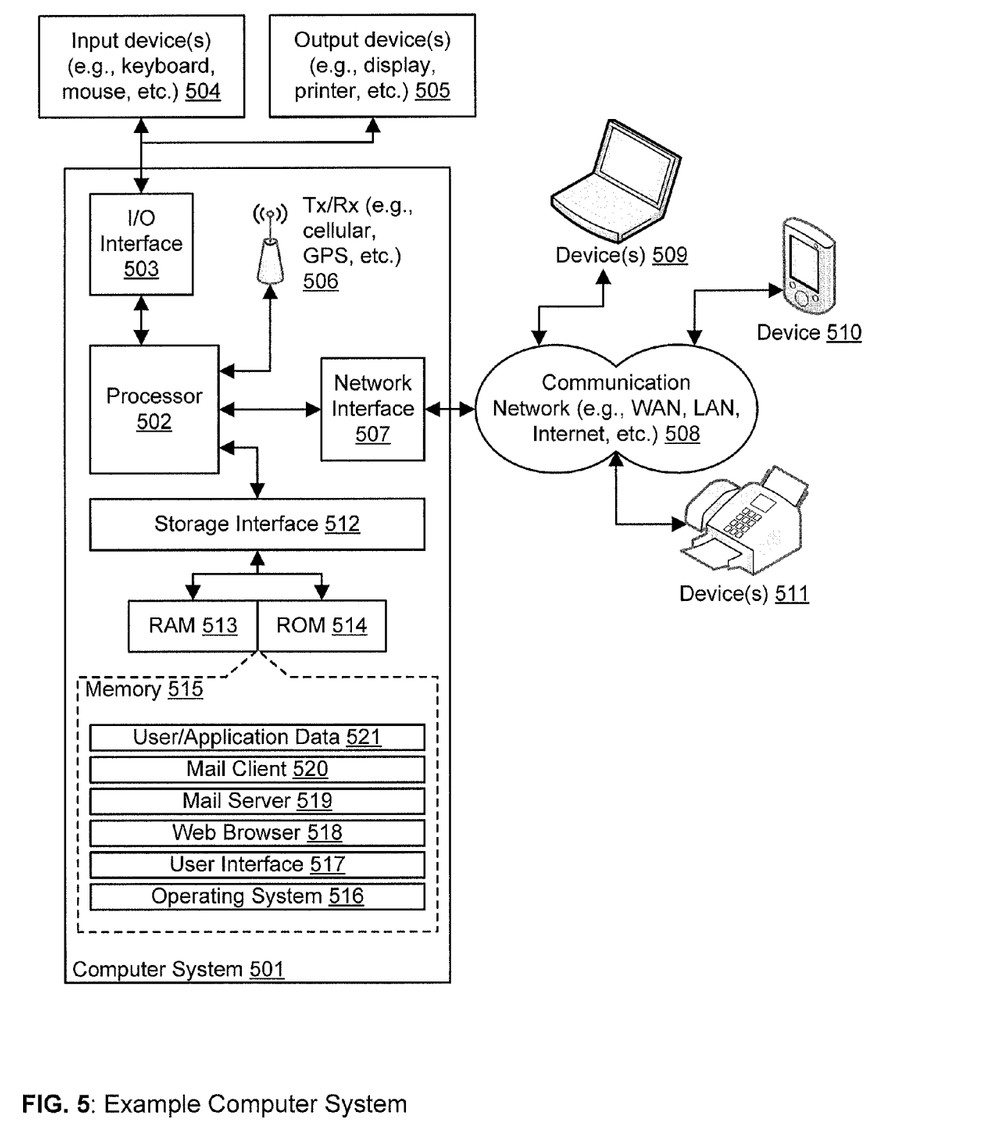
FIG. 5 is a block diagram of an exemplary computer system for implementing embodiments consistent with the present disclosure.

FIG. 5 is a block diagram of an exemplary computer system for implementing embodiments consistent with the present disclosure. Variations of computer system 501 may be used for implementing the devices and/or system described herein. Computer system 501 may comprise a central processing unit ("CPU" or "processor") 502. Processor 502 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 510, 511, and 512. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, the databases and stores of information described herein.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 501 may implement a web browser 518 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 501 may implement a mail server 519 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 501 may implement a mail client 520 stored program component. The mail client may be a mail viewing application, such as Apple Mail, Microsoft Entourage, Microsoft Outlook, Mozilla Thunderbird, etc.

In some embodiments, computer system 501 may store user/application data 521, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described a system and method for steady state performance testing of a multiple output software system. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented performance test steady-state determination method, comprising:
    executing, via one or more hardware processors, a performance test of a web-based application;
    calculating, via the one or more hardware processors, a plurality of output metrics based on the performance test;
    calculating, via the one or more hardware processors, an overall steadiness score based on a matrix of a plurality of rows and a plurality of columns, wherein each of the plurality of rows corresponds to each of the plurality of output metrics, each of the plurality of columns corresponds to each of a plurality of time windows, and one of the plurality of columns corresponds to a priority of each of the plurality of output metrics, wherein each cell of the matrix comprises at least one of a steadiness computation value or a priority weight; and
    providing, via the one or more hardware processors, an overall steadiness indication based on the overall steadiness score, wherein the overall steadiness score is based on a determination of whether each of the plurality of output metrics has achieved a steady state within the plurality of time windows; and
    wherein, for each of the plurality of output metrics, the determination of whether the output metric has achieved the steady state within the plurality of time windows comprises:
    for each of the plurality of time windows:
        calculating an average value for the output metric within the time window;

determining whether a maximum value for the output metric within the time window deviates by less than a predetermined threshold value from the average value; and determining whether a minimum value for the output metric within the time window deviates by less than a predetermined threshold values from the average value.

2. The method of claim 1, wherein the each of the plurality of time windows is at least one of a micro, a macro and a global time window.

3. The method of claim 2, further comprising:
generating, via the one or more hardware processors, the overall steadiness score based on the determination of whether each of the plurality of output metrics has achieved the steady state within the micro, macro, and global time windows; and
determining whether to provide the overall steadiness indication based on the overall steadiness score.

4. The method of claim 3, wherein the overall steadiness score is generated as:

$$S=\Sigma_{j=1}^{K} P_j \times (B_j^{Micro}+B_j^{Macro}+B_j^{Global}),$$

wherein S is the overall steadiness score, K is a number of output metrics, $P_j$ is a priority weight corresponding to a $j^{th}$ metric, and $B_j^{Micro}$, $B_j^{Macro}$, and $B_j^{Global}$ are values indicating steadiness of the $j^{th}$ metric within the micro, macro, and global time windows respectively.

5. The method of claim 4, wherein $B_j^{Micro}$, $B_j^{Macro}$, and $B_j^{Global}$ are binary values.

6. The method of claim 2, wherein the micro, macro, and global time windows are defined based on user input either statically, or dynamically, or both, within a continuum of tests.

7. The method of claim 6, wherein the micro time window is set by a user to 1% of an overall time span for the performance test, the macro time window is set by the user to 10% of the overall time span for the performance test, and the global time window is set by the user to 100% of the overall time span for the performance test.

8. The method of claim 7, wherein the overall time span for the performance test is determined based on an input traffic profile for the performance test.

9. A performance test steady-state determination system, comprising:
a hardware processor; and a memory storing instructions executable by the hardware processor for:
executing, via one or more hardware processors, a performance test of a web-based application;
calculating, via the one or more hardware processors, a plurality of output metrics based on the performance test;
calculating, via the one or more hardware processors, an overall steadiness score based on a matrix of a plurality of rows and a plurality of columns, wherein each of the plurality of rows corresponds to each of the plurality of output metrics, each of the plurality of columns corresponds to each of a plurality of time windows, and one of the plurality of columns corresponds to a priority of each of the plurality of output metrics, wherein each cell of the matrix comprises at least one of a steadiness computation value or a priority weight; and
providing, via the one or more hardware processors, an overall steadiness indication based on the overall steadiness score wherein the overall steadiness score is based on a determination of whether each of the plurality of output metrics has achieved a steady state within the plurality of time windows; and wherein, for each of the plurality of output metrics, the determination of whether the output metric has achieved the steady state within the plurality of time windows comprises:
for each of the plurality of time windows:
calculating an average value for the output metric within the time window;
determining whether a maximum value for the output metric within the time window deviates by less than a predetermined threshold value from the average value; and
determining whether a minimum value for the output metric within the time window deviates by less than a predetermined threshold values from the average value.

10. The system of claim 9, wherein the each of the plurality of time windows is at least one of a micro, a macro and a global time window.

11. The system of claim 10, the memory further storing instructions for:
generating, via the one or more hardware processors, the overall steadiness score based on the determination of whether each of the plurality of output metrics has achieved the steady state within the micro, macro, and global time windows; and
determining, via the one or more hardware processors, whether to provide the overall steadiness indication based on the overall steadiness score.

12. The system of claim 11, wherein the overall steadiness score is generated as:

$$S=\Sigma_{j=1}^{K} P_j \times (B_j^{Micro}+B_j^{Macro}+B_j^{Global}),$$

wherein S is the overall steadiness score, K is a number of output metrics, $P_j$ is a priority weight corresponding to a $j^{th}$ metric, and $B_j^{Micro}$, $B_j^{Macro}$, and $B_j^{Global}$ are values indicating steadiness of the $j^{th}$ metric within the micro, macro, and global time windows respectively.

13. The system of claim 12, wherein $B_j^{Micro}$, $B_j^{Macro}$, and $B_j^{Global}$ are binary values.

14. The system of claim 10, wherein the micro, macro, and global time windows are defined based on user input either statically, or dynamically, or both, within a continuum of tests.

15. The system of claim 14, wherein the micro time window is set by a user to 1% of an overall time span for the performance test, the macro time window is set by the user to 10% of the overall time span for the performance test, and the global time window is set by the user to 100% of the overall time span for the performance test.

16. The system of claim 15, wherein the overall time span for the performance test is determined based on an input traffic profile for the performance test.

17. A non-transitory computer-readable medium storing performance test steady-state determination instructions for:
executing, via one or more hardware processors, a performance test of a web-based application;
calculating, via the one or more hardware processors, a plurality of output metrics based on the performance test;
calculating, via the one or more hardware processors, an overall steadiness score based on a matrix of a plurality of rows and a plurality of columns, wherein each of the plurality of rows corresponds to each of the plurality of output metrics, each of the plurality of columns corresponds to each of a plurality of time windows, and one of the plurality of columns corresponds to a priority of each of the plurality of output metrics wherein each cell of the matrix comprises at least one of a steadiness computation value or a priority weight; and providing, via the one or more hardware processors, an overall steadiness indication based on the overall steadiness score wherein the overall steadiness score is based on a determination of whether each of the plurality of output metrics has achieved a steady state within the plurality of time windows; and wherein, for each of the plurality of output metrics, the determination of whether the output metric has achieved the steady state within the plurality of time windows comprises:

for each of the plurality of time windows:
calculating an average value for the output metric within the time window;
determining whether a maximum value for the output metric within the time window deviates by less than a predetermined threshold value from the average value; and
determining whether a minimum value for the output metric within the time window deviates by less than a predetermined threshold values from the average value.

18. The medium of claim 17, wherein the each of the plurality of time windows is at least one of a micro, a macro and a global time window.

19. The medium of claim 18, the memory further storing instructions for:

generating, via the one or more hardware processors, the overall steadiness score based on the determination of whether each of the plurality of output metrics has achieved the steady state within the micro, macro, and global time windows; and determining, via the one or more hardware processors, whether to provide the overall steadiness indication based on the overall steadiness score.

20. The medium of claim 19, wherein the overall steadiness score is generated as:

$$S=\Sigma_{j=1}^{K}P_j \times (B_j^{Micro}+B_j^{Macro}+B_j^{Global}),$$

wherein S is the overall steadiness score, K is a number of output metrics, $P_j$ is a priority weight corresponding to a $j^{th}$ metric, and $B_j^{Micro}$, $B_j^{Macro}$ and $B_j^{Global}$ are values indicating steadiness of the $j^{th}$ metric within the micro, macro, and global time windows respectively.

21. The medium of claim 20, wherein $B_j^{Micro}$, $B_j^{Macro}$, and $B_j^{Global}$ are binary values.

22. The medium of claim 18, wherein the micro, macro, and global time windows are defined based on user input either statically, or dynamically, or both, within a continuum of tests.

23. The medium of claim 22, wherein the micro time window is set by a user to 1% of an overall time span for the performance test, the macro time window is set by the user to 10% of the overall time span for the performance test, and the global time window is set by the user to 100% of the overall time span for the performance test.

24. The medium of claim 23, wherein the overall time span for the performance test is determined based on an input traffic profile for the performance test.

* * * * *